(12) United States Patent
Mahaffey

(10) Patent No.: US 9,610,883 B1
(45) Date of Patent: Apr. 4, 2017

(54) TENSIONING DEVICE

(71) Applicant: Jay Lawrence Mahaffey, Buhl, ID (US)

(72) Inventor: Jay Lawrence Mahaffey, Buhl, ID (US)

(73) Assignee: Pacific States Manufacturing, Inc, Buhl, ID (US)

( * ) Notice: Subject to any disclaimer, the term of this patent is extended or adjusted under 35 U.S.C. 154(b) by 0 days.

(21) Appl. No.: 14/973,932

(22) Filed: Dec. 18, 2015

(51) Int. Cl.
*B60P 7/08* (2006.01)
*F16G 11/12* (2006.01)

(52) U.S. Cl.
CPC .............. *B60P 7/083* (2013.01); *F16G 11/12* (2013.01)

(58) Field of Classification Search
CPC .................................. B60P 7/083; F16G 11/12
USPC ...... 410/12, 85, 96, 97, 100; 403/43, 44, 46, 403/48; 24/68 CD, 68 CT; 254/241, 243; 248/499
See application file for complete search history.

(56) References Cited

U.S. PATENT DOCUMENTS

| | | | | |
|---|---|---|---|---|
| 6,048,146 A | * | 4/2000 | Wiedmeyer | B60P 7/083 410/100 |
| 6,065,914 A | * | 5/2000 | Fotou | B60P 3/079 410/100 |
| 7,458,757 B1 | * | 12/2008 | Manesis | B60P 7/0823 410/100 |

* cited by examiner

*Primary Examiner* — Stephen Gordan
(74) *Attorney, Agent, or Firm* — Thomas M. Spear, Jr.

(57) ABSTRACT

A tensioning device comprised of; a gear box containing a bevel gear assembly inside the gear box with one gear attached directly to a barrel which passes through the gear box and threaded shafts at either end of the barrel. Inside the gear box is a guide which is placed such that a drive gear and the barrel gear are engaged when assembled and a socket wrench receptacle is part of the drive gear. The threaded shafts move in and out of the barrel based on the rotation of the gear. The tensioning device uses direct gearing of the rotational motion of the drive gear to rotate the barrel causing the shafts to be linearly displaced tightening or loosening a chain, cable or strap.

5 Claims, 4 Drawing Sheets

SECTION A-A

TENSIONING DEVICE

CROSS REFERENCE TO RELATED APPLICATIONS

None

STATEMENT REGARDING FEDERALLY SPONSORED RESEARCH OR DEVELOPMENT

None

BACKGROUND OF THE INVENTION

Figure 1:
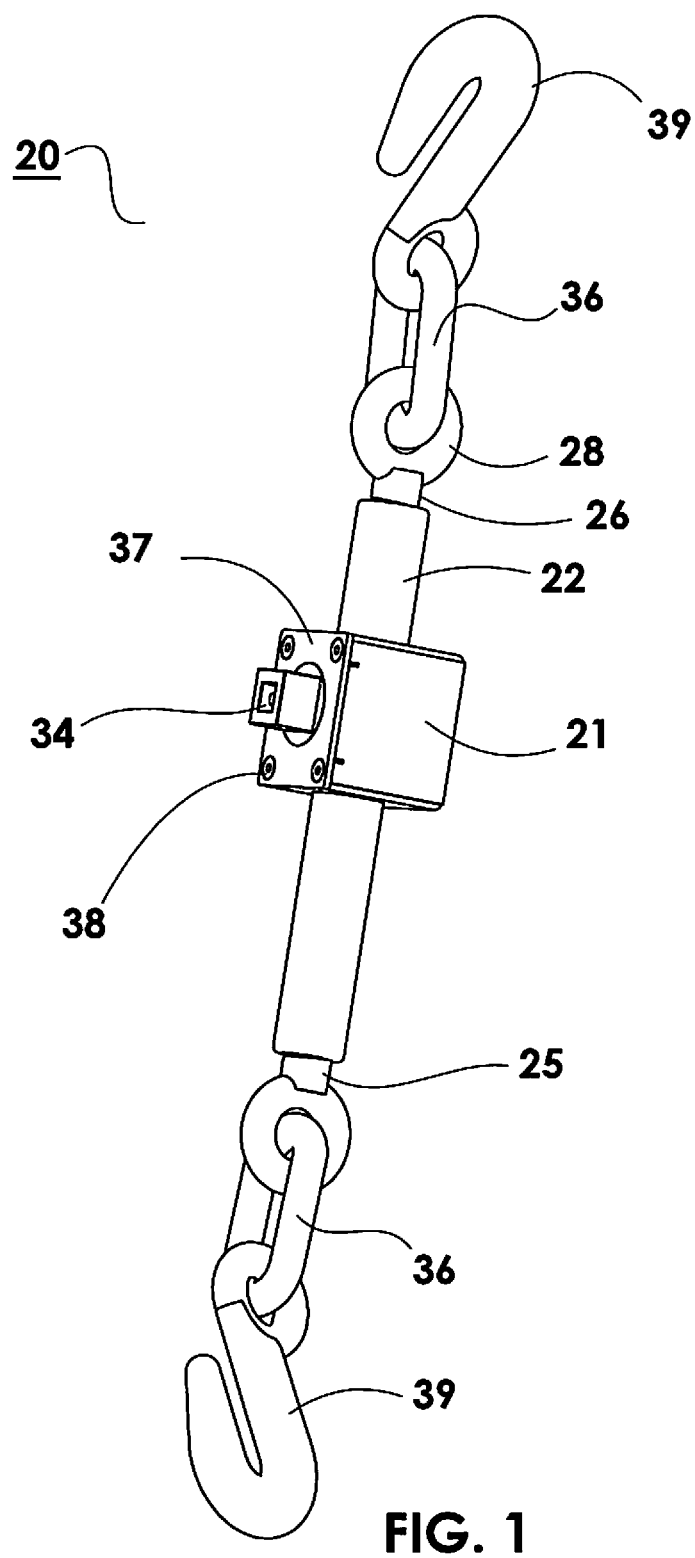

This invention relates to a tensioning device. A tensioning device is used to tighten a chain, cable, strap or similar material. There are several types of tensioning devices, including but not limited to; load binders and turnbuckles.

Load binders are tools used to secure cargo or loads to trucks, ships, vessels or other types of load carriers. Cargo or load is a generic term and is used in the broadest sense possible, including but not limited to crates, boxes, logs, pipes, rods, and containers. Typically load binders secure loads to the carrier during transport or movement. A load binder is an apparatus for tensioning a chain, cable, strap or similar material to secure a load.

Turnbuckles are devices for creating tension using threaded components to lengthen or shorten chains, cables, straps or similar material creating a tension in the material. There are many uses and varieties of turnbuckles in the market. A tension device is often time used for strapping down cargo or loads. A cable, chain or strap is strategically placed over or around a load and then secured to a carrier. The turnbuckle is used to tighten the cargo or load to reduce movement. It is apparent from the various descriptions of turnbuckles and load binders that they perform a similar function; tensioning a chains, cable, strap or similar material.

In the description presented in this application, the inventor is using the term "chain" for the material that is tensioned. Chain is a generic term and encompasses cable, straps, ropes or other similar type material. The tensioning device in the present invention can be used with the various types of material known to those skilled in the art of load binders and turnbuckles. The present description makes no claims on the various materials, such as chains, used in tensioning devices, load binders or turnbuckles. It has been noted by the inventor that the various types of tensioning device on the market and in the prior art have several drawbacks from the present invention.

There is a plethora of tensioning devices in the prior art. The chain, cable, strap or similar material for securing a load has a means for tightening the chain, cable, strap or similar material to secure the load to the carrier. See U.S. Pat. No. 139,969 to J. Paff, describing a lever type action used to tighten a chain as the lever is leveraged in the apparatus against the chain and then secured. And, U.S. Pat. No. 4,058,291 to K. Shreyer, et al., describing an apparatus for tensioning a chain with a lever and means for securing the lever during a retrogressive movement as the chain is tightened. It has been observed by the inventor that these types of tensioning devices have levers that are prone to springing free and can cause harm to a user or unloosen loads. Additionally, the lever can get in the way and does not store efficiently during transport.

Load binders, commonly used by transporters, include typical lever action devices. Once the chain is tightened to an appropriate tension, the lever is secured or latched such that the lever is under some tension with a locking mechanism to secure the lever. There are many types of lever and locking mechanisms but in the present state of load binders, the lever when the load is secured has tensioned force that once released from the locking mechanism springs open with force and has been observed by the inventor to be potentially harmful to operators or cargo.

The present invention replaces this type of leveraged tension with tensioning device that utilizes the threaded mechanism commonly found in turnbuckles. This eliminates the possibility of the tensioned lever springing open and possibly harming an operator or prematurely releasing the load.

Some load binders, similar to the present invention, use screw or threaded mechanisms for tightening the chain. See, U.S. Pat. No. 4,567,627 to W. Patterson, III, which discloses a load binder with a telescopically retrievable inner and outer sleeve in which the chain is tightened as a threaded connection is tightened and the chain is attached to the sleeves. The present invention improves upon this type of invention by making the apparatus more compact and more efficient as the rotation of the present device more rapidly and more efficiently tightens said chain through a more direct translation of angular movement into axial movement. The present invention uses fewer parts and a more direct translation for tightening the chain. In addition, the present invention can use various means or tools for tightening the chains instead of an attached lever or handle such as an impact wrench.

A similar but less efficient and more complex device compared to the present invention is described in U.S. Pat. No. 4,973,185 to H. Thaller. This chain tightening device uses a gear and two rods to rotate and transmit the applied angular movement producing tension in the cable when the threaded rods displace a coupling device. The turnbuckle of this invention relies on the tensioned force to be transmitted through the body of the turnbuckle and uses two rotating rods for translating the angular force into axial force. The present invention uses one rod with fewer parts and a more efficient transmission of converting angular rotation into axial displacement thereby tensioning the chain more efficiently. There are fewer parts in the present invention from the prior art and the reduction in gearing allows for a lighter weight.

BRIEF SUMMARY OF THE INVENTION

A tensioning device, comprised of; a gear box, a barrel which is tubular shaped an axis of the barrel along a length of the tube, barrel gearing affixed to the exterior of said barrel with the barrel gearing completely encircling the barrel perpendicular to the axis of the barrel's length, a guide inside of said gear box; a stub extending out of the guide; the gear box having two holes in the gear box, the first hole is situated opposite from the second hole and the holes are sized to allow the barrel to pass through the gear box and sized such that the barrel is able to rotate along its axis, the guide having two holes on the sides of the guide, the first hole is opposite from the second hole and sized to allow the barrel to pass through the guide holes with the barrel able to rotate freely, the gear box assembled such that the barrel passes through the two holes in the gear box and the two holes of the guide with the barrel gear located inside the gear box but outside the guide, the drive gear and socket wrench receptacle placed over the stub and the drive gear engaged with the barrel gear, a cover enclosing the drive hear inside the gear box with a hole in the cover in which the socket wrench receptacle passes through for rotating the receptacle, the barrel having two ends, the first end of said barrel having right hand threads within said first end of the barrel and a second end of said barrel with left hand threads within said second end of the barrel, two shafts each shaft having two ends with the first shaft having right hand threads at one end of the first shaft and the second shaft having left hand threads at one end of the second shaft, the first shaft threaded into the end of the barrel with the right hand threads and the second shaft threaded into the end of the barrel with the left hand threads, the other end of the first and second shafts having a means for connecting a chain, cable, strap or similar material, to the shaft and means for rotating said socket wrench receptacle such that the rotational motion of the socket results in linear displacement of said shafts into or away from the said gear box.

BRIEF DESCRIPTION OF THE SEVERAL DRAWINGS

Figure 2:
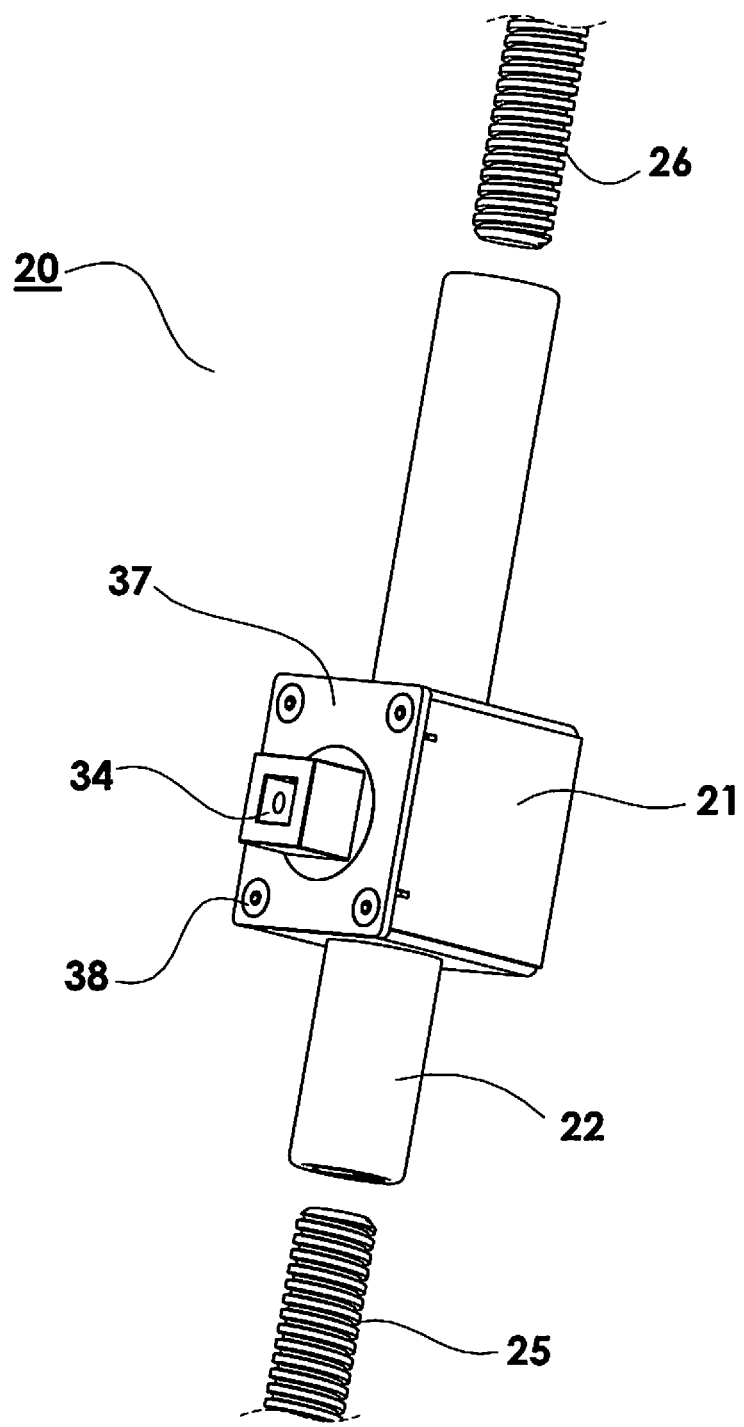

FIG. 1 is a side perspective view of a tensioning device.
FIG. 2 is a side perspective view of a gear box and a barrel with left and right hand threaded shafts.
FIG. 3A is a cross sectional view of a gear box and a barrel and right and left hand threaded shafts.
FIG. 3B is a top planar view of the gear box, barrel and socket wrench receptacle.
FIG. 4 is an exploded view of a tensioning device.

DESCRIPTION

Various embodiments of apparatus will now be described. The following descriptions provide specific details for a thorough understanding and enabling description of these embodiments. It should be noted, however, that the above "Background" describes technologies that may enable aspects and embodiments of the invention. One skilled in the relevant arts will understand, however, that the invention may be practiced without many of these details. Additionally, some well-known structures or functions may not be shown or described in detail, so as to avoid unnecessarily obscuring the relevant description of the various aspects and embodiments of the invention.

The terminology used in the description presented below is intended to be interpreted in its broadest reasonable manner, even though it is being used in conjunction with a detailed description of certain specific embodiments of the invention. Certain terms may even be emphasized herein; however, any terminology intended to be interpreted in any restricted manner will be overly and specifically defined as such in this Detailed Description section.

FIG. 1 depicts a tensioning device 20 with a gear box 21, a barrel 22 which transverses through said gear box as depicted in FIG. 1. Inserted into the ends of the barrel are two shafts, a right hand threaded shaft 25 extending out one end of the barrel and a left hand threaded shaft 26 extending out the other end of the barrel. The ends of the right and left hand threaded shafts that are not threaded into the barrel have an eye bolt 28 attached to the opposite ends of the shaft from the threaded ends. A link 36 and hook 39 are attached to each eye bolt for attaching to a chain or cable.

The gear box 21 has a socket wrench receptacle 34 that extends out of one side of the gear box. A cover 37 and four screws 38 securing said cover to the gear box are shown as well. The gear box 21 construction in the present description is not intended to be a limiting description as other means for creating a single housing for the two gears is known to those skilled in the art of manufacturing tensioning devices. Inside the gear box is a bevel gear assembly that will be described below.

Figure 3:
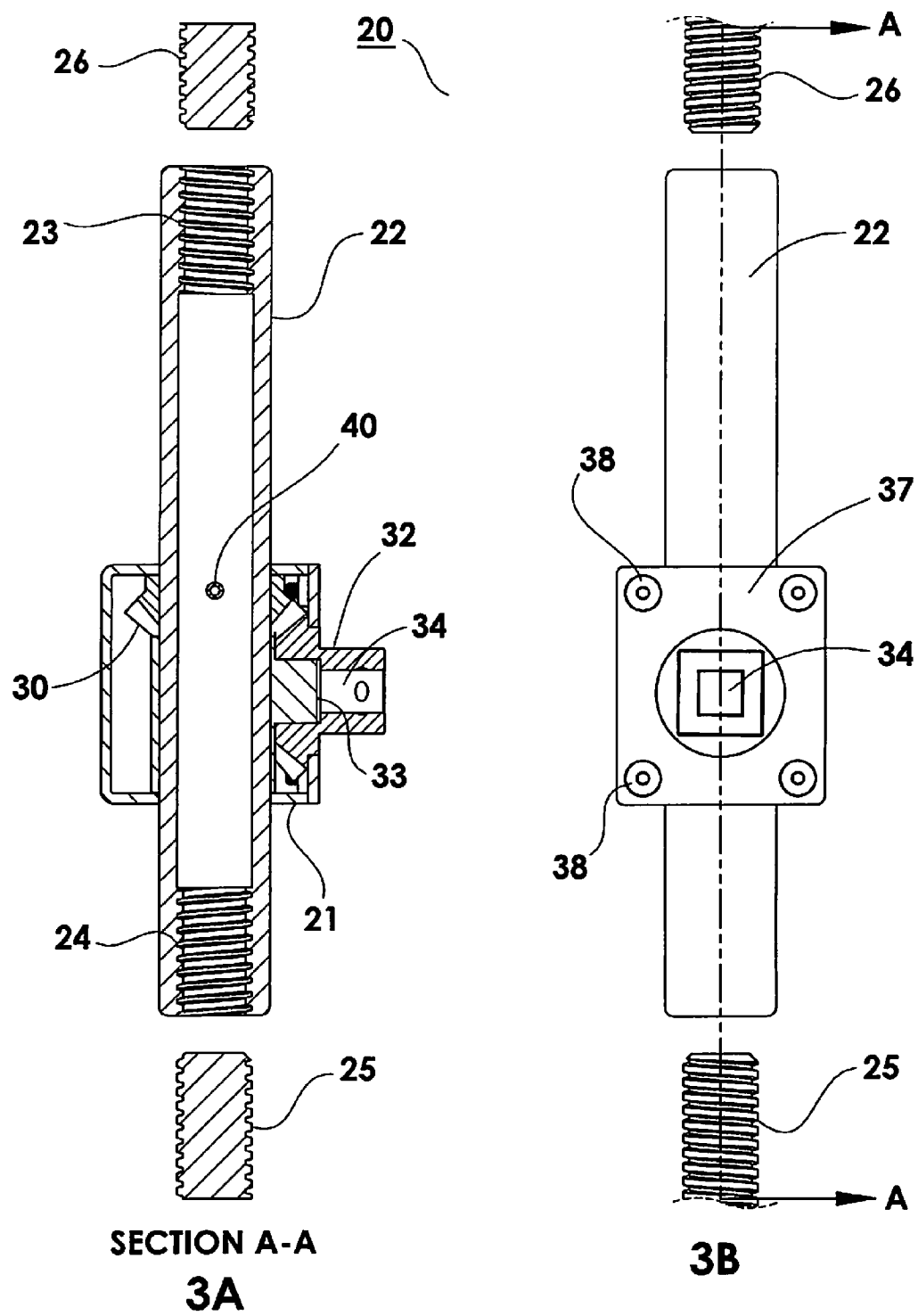
Figure 4:
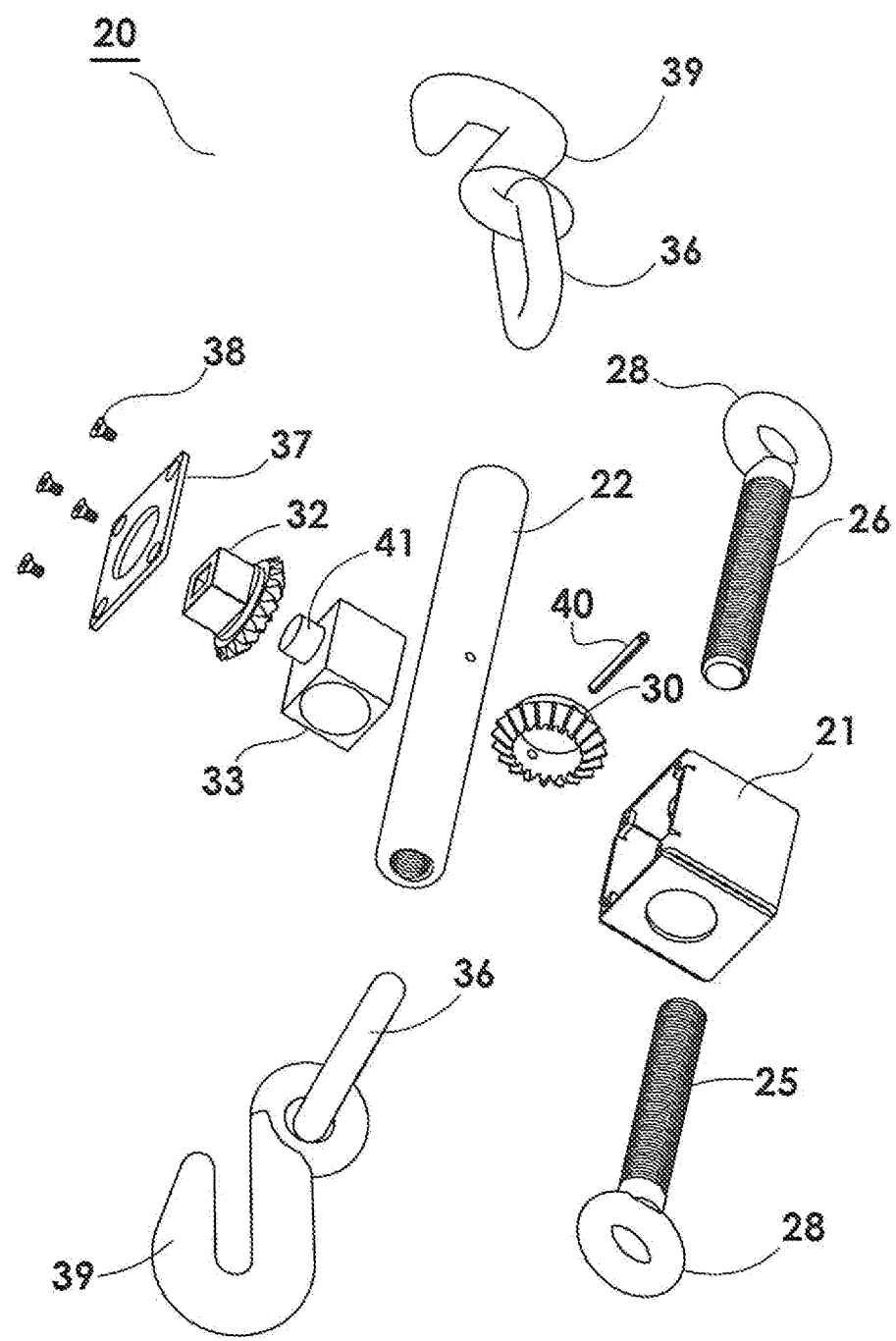

Inside the gear box 21, the barrel passes through two holes on opposite sides of the gear box, see FIGS. 3 and 4. The holes are sized to allow the barrel to rotate freely along the length of the barrel called the rotational axis. Inside the gear box is a guide 33. The guide is shaped like a box and smaller than the gear box. The guide has two holes on opposite sides in which the barrel also passes through. The guide has a stub 41 that extends out one side of the guide. The gear drive and socket wrench receptacle sit over the stub and the stub is positioned such that when the gear box is assembled the drive gear and barrel gear are engaged, see FIG. 3A. The barrel gear sits inside the gear box 21 but outside the guide 33.

When the gear box is assembled, the drive gear 32 and socket wrench receptacle 34 sit on the stub 41 of the guide. The barrel 22 is placed such that the tube of the barrel passes through the two holes of the guide and the barrel gears 30 are engaged with the drive gear 32. The assembly is done such that the barrel gear, drive gear and guide are inside the gear box 21. The cover 37 has a hole in which the socket wrench receptacle passes through as the cover is placed over the open end of the gear box. The four screws 38 are placed to secure the cover and the gear assembly in place.

This type of gearing is known to those skilled in the art as a bevel gear. The rotational axis of the drive gear is ninety degrees from the rotational axis of the barrel gear. There are various types of bevel gears and it is not the intent of the present invention to limit the type of bevel gearing deployed. For example, the Figures used in this application show a straight bevel gear—one in which the teeth of the gear are straight. Other types of bevel gearing can be used, such as spiral bevel gears—one in which the teeth are curved at an angle to allow tooth contact to be more gradual and smooth. Other types of bevel gears that can be used are zerol bevel gears or hypoid bevel gears and these types of gears are known to those skilled in the art of manufacturing bevel gears. It is not the intent of the present invention to limit which type of bevel gearing is used.

When a load has been placed onto a carrier, such as a truck, train, ship or railcar, the chain or similar binding material needs to be tightened to ensure the load does not move during transport. Movement of heavy loads can cause the load to come free and damage the carrier or injure persons near the carrier when the load becomes free. Movement is minimized to prevent load shifts and other dangerous situations. Any movements of loads during transport are amplified by the shifting of the weight of the load by the force generated during such movement. Keeping loads secure and immobile is a key function of the tensioning device. Tensioning devices are used to tighten chains, cables or straps affixing said loads to the carrier to prevent the shifting of loads.

For the purposes of this description, a chain will be described as the material used to bind a load, however, a cable or similar material can be used in place of a chain. Load binders provide a means for tightening the chain once the load is in place and the chain has been placed such that the load is secured by the chain. Typically, the hooks in the tensioning device are inserted into a link of the chain securing the load in order to make tighter the chain securing the load. As the tensioning devices' hooks traverse toward each other, the chain will tighten.

The displacement of the hooks 39 is caused when the socket wrench receptacle 34 is rotated. See FIG. 2. There are a number of means for rotating the socket wrench receptacle 34 and the gears and the present invention describes using an impact wrench, a socket wrench or other similar tool. The socket wrench receptacle 34 is shown and rotated by whichever tool an operator might use as the means for rotating the inner gears. An appropriate sized impact or socket wrench is inserted into the receptacle and the receptacle is rotated to tighten or loosen the chain. Other tools or means for rotating the gear are known to those skilled in the art and it is not the intention of the inventor to limit the invention by use of the socket wrench receptacle.

From FIG. 2, the right hand threaded shaft 25 is inserted into the right hand threaded end of the barrel 22 and the left hand threaded shaft 26 is inserted into the left hand threaded end of the barrel. The shafts are axially displaced when the socket wrench receptacle is rotated.

When the socket wrench receptacle is rotated, the drive gear 32, which is attached or part of the socket wrench receptacle, is rotated as well, see FIG. 3A. Gear teeth of the drive gear 32, which is located inside the gear box, are engaged with the gear teeth of a barrel gear 30 which is attached directly to the barrel 22. The barrel gear 30 is directly attached to the barrel and is located inside the gear box and engaged to the drive gear. As the socket wrench receptacle is turned, the drive gear is rotated which in turns rotates the barrel gear and in turn, rotates the barrel 22. The rotation of the socket wrench receptacle rotates the barrel and it is done so ninety degrees from the rotational plane of the drive gear and socket wrench receptacle.

The barrel gear 30 is attached to the barrel by means of a roll pin 40, see FIG. 3A. It is not the intent of the present invention to claim a means for attaching a gear to the barrel and any means for attaching the gear to the outer surface of the barrel is acceptable. The barrel 22 is a tubular shaped and has two ends. At one end of the barrel there is right hand threads 23 located within the barrel end and at the opposite end of the barrel there is left hand threads 24 located within the barrel end. The barrel runs through the gear box along the length of the barrel's axis with the gear box containing both the barrel gear and the drive gear which are engaged inside the gear box. The holes in gear box and guide are sized to allow the barrel to rotate while the gear box is stationary.

The rotation of the barrel within the gear box is done by means of a guide 33; see FIG. 3A and FIG. 4. The guide 33 is a device placed within the gear box that allows the barrel to rotate freely through the guide but keeps the barrel gear and drive gear in place by pressing the sides of the guide to the inside of the gear box and by fixing the drive gear in place. The gears are able to rotate and the barrel is able to turn within the guide. The drive gear 32 sits on top of the guide 33. The guide, which is box shaped and sized to fit inside the gear box, has a stub 41 protruding on the side in which the drive gear is situated. The guide is sized such that the guide is snug inside the gear box and does not rotate with the barrel 22 or the drive gear 32 when the gears are rotated. The drive gear 32 is placed over the stub 41 with the sizing of the interior of the gear slightly larger than the size of the stub. The drive gear 32 is able to rotate around the stub and the guide is fixed in place by the fit of the guide within the gear box. The size of the gear box and the placement of the stub engage the barrel gear teeth with the drive gear teeth when the gear box is assembled.

FIG. 4 is an exploded view of the various parts. To assemble the tensioning device, the guide 33 is placed in the gear box as the guide is boxed shaped but slightly smaller than the gear box dimensions. The barrel is placed through a first hole in one side of the gear box and a first hole in one side of the guide. The barrel is passed through another hole on the other side of the guide opposite the first hole and a hole on the other side of the gear box opposite of the first hole of the gear box. A barrel gear is placed inside the gear box but outside the guide and the barrel is run through a center of the barrel gear and fixed in place with a roll pin 40 which passes through a small hole in the gear and the barrel. The drive gear is placed over the stub and placed to engage the barrel gear as the two gears are sized to be engaged when placed inside the gear box. The drive gear is on the stub engaged with the barrel gear and able to rotate around the stub causing the barrel gear gears and barrel to rotate ninety degrees from the rotational plane of the drive gear.

When the barrel is rotated, the right and left hand threads inside the ends of the barrel are rotated as well. The right and left hand threaded shafts 25 and 26 are threaded out or into the end of the barrel or axially displaced in or out depending on the direction of the rotation of the socket wrench receptacle. When the barrel is rotated such that the two shafts are axially displaced toward the gear box, any chain, cable or strap attached to the hooks will become tighter. When the barrel is rotated the opposite direction, the two threaded shafts are axially displaced away from the gear box and the chain, cable or other similar material is slackened.

When the chain is tightened, a locking device—not shown—is used to secure the gears in place. A toggle is placed on the gear box and when the chain is set to the appropriate tension, the toggle is placed on the gears to prevent the gears from rotating during transport. The toggle is a push button or lever action piece that can be spring loaded to secure the gears at the appropriate place. It is not the intention of the inventor to claim a locking device as that technology is known to those skilled in the art. One embodiment of the present invention includes a means for locking the gears in place once the appropriate tension is set and it would be a part of the gear box apparatus.

The present invention is an improvement on the prior art in that the there are fewer pieces in the apparatus and the tension is directed through the barrel directly thereby eliminating additional stress through any other component. The fewer pieces in the tensioning device allows for a more efficient, lighter weight and more economical tool for binding loads or tensioning chains, cables, straps. Additionally, when the chain, cable or strap is tightened the tensioning device can be loosened without the potential for springing the lever into the operator.

The size and dimension of the various parts can vary, such as the length of the barrel and the size and dimension of the threading in the barrel and the threads of the shaft. The linear displacement of the two shafts is completed more efficiently with the rotational motion of the gear drive directly engaged to the barrel drive. The tension that is created is directly transmitted through the barrel and the barrel is constructed such a that the chain, cable, strap or similar material will be a more limiting issue for someone tensioning a chain, cable, strap or similar material with a load.

I claim:

1. A tensioning device, comprised of; a gear box, a barrel which is tubular shaped having a rotational axis along a length of the tube, a barrel gear affixed to the exterior of said barrel with the barrel gear completely encircling the barrel perpendicular to an axis of the barrel's length, a guide inside of said gear box; a stub extending out of the guide; the gear box having two holes in the gear box, a first hole of the holes is situated opposite from a second hole of the holes and the two holes are sized to allow the barrel to pass through the gear box and sized such that the barrel is able to rotate along its rotational axis, the guide having two holes on sides of the guide, a first hole of the guide holes is opposite from a second hole of the guide holes and sized to allow the barrel to pass through the guide holes with the barrel able to rotate freely along the barrel's rotational axis, a gear box assembled such that the barrel passes through the two holes in the gear box and the two holes of the guide with the barrel gear located inside the gear box but outside the guide, a drive gear and socket wrench receptacle are placed over the stub and the drive gear engaged with the barrel gear to form a bevel gear, a cover enclosing the drive gear inside the gear box with a hole in the cover in which the socket wrench receptacle passes through for rotating the socket wrench receptacle, the barrel having two ends, a first end of the two ends of said barrel having right hand threads within said first end of the barrel and a second end of the two ends of said barrel having left hand threads within said second end of the barrel, two shafts with each shaft having two ends with a first shaft of the two shafts having right hand threads at one end of the first shaft and a second of the two shafts having left hand threads at one end of the second shaft, the first shaft threaded into the end of the barrel with the right hand threads and the second shaft threaded into the end of the barrel with the left hand threads, another end of each of the first and second shafts having a means for connecting a chain, cable, or strap, to the respective shaft and means for rotating said socket wrench receptacle such that rotational motion of the socket wrench receptacle results in linear displacement of said shafts into or away from the said gear box.

2. The tensioning device of claim 1, further comprising; an impact wrench sized to fit the socket wrench receptacle for rotating the socket wrench receptacle.

3. The tensioning device of claim 1 wherein the means for connecting comprising an eye bolt attached to the second end of the shafts with a link attached to the respective eye bolt and a hook attached to the respective link and the hook used to attach to a chain, cable, or strap to the tensioning device.

4. The tensioning device of claim 1, further comprising a spring loaded toggle set into the gear box and engaged with gear teeth of the drive gear and releasable when said toggle is compressed allowing for rotation of said drive and barrel gears when disengaged and securing said drive gear when said toggle is not compressed.

5. The tensioning device of claim 1, further comprising the bevel gear formed by the drive gear and barrel gear comprises one of the following: a straight line bevel gear; a spiral bevel gear; a zerol bevel gear; or a hypoid bevel gear.

* * * * *